United States Patent
Haeming et al.

(10) Patent No.: US 11,479,869 B2
(45) Date of Patent: Oct. 25, 2022

(54) ELECTROLYSIS APPARATUS FOR THE ELECTROLYTIC PRODUCTION OF OXYGEN FROM OXIDE-CONTAINING STARTING MATERIAL

(71) Applicant: Airbus Defence and Space GmbH, Taufkirchen (DE)

(72) Inventors: Marc Haeming, Friedrichshafen (DE); Achim Seidel, Uhldingen-Muehlhofen (DE); Uwe Zell, Salem (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/068,079

(22) Filed: Oct. 12, 2020

(65) Prior Publication Data
US 2021/0123148 A1    Apr. 29, 2021

(30) Foreign Application Priority Data
Oct. 24, 2019   (EP) ..................................... 19205192

(51) Int. Cl.
| | | |
|---|---|---|
| C25B 9/23 | (2021.01) | |
| C25B 1/02 | (2006.01) | |
| C25B 13/07 | (2021.01) | |
| C25B 9/60 | (2021.01) | |
| C25B 9/09 | (2021.01) | |

(52) U.S. Cl.
CPC .................. C25B 9/23 (2021.01); C25B 1/02 (2013.01); C25B 9/09 (2021.01); C25B 9/60 (2021.01); C25B 13/07 (2021.01)

(58) Field of Classification Search
USPC ........................................................ 205/634
See application file for complete search history.

(56) References Cited

U.S. PATENT DOCUMENTS

| | | | |
|---|---|---|---|
| 7,279,245 B1 * | 10/2007 | Clark | H01M 8/04097 |
| | | | 429/410 |
| 8,066,861 B1 | 11/2011 | Park | |
| 9,358,501 B1 * | 6/2016 | Setlock | C25B 1/02 |
| 10,106,767 B2 * | 10/2018 | Hartstein | C12M 21/02 |
| 2016/0145754 A1 * | 5/2016 | Powell, IV | C25C 7/005 |
| | | | 204/251 |

FOREIGN PATENT DOCUMENTS

| | | |
|---|---|---|
| DE | 10156349 A1 | 5/2003 |
| JP | 2009138254 A | 6/2009 |

OTHER PUBLICATIONS

Extended European Search Report dated May 4, 2020 issued in corresponding EP patent application, No. 19205192.8 (and English Translation).

(Continued)

*Primary Examiner* — Brian W Cohen
(74) *Attorney, Agent, or Firm* — Posz Law Group, PLC

(57) ABSTRACT

An electrolysis apparatus for the electrolytic production of oxygen from oxide-containing starting material includes at least one cathode which at least partly delimits a receiving region which in at least one operation state is configured for receiving the oxide-containing starting material and at least one anode,
wherein the electrolysis apparatus has at least one selective oxygen pump which is at least partly realized integrally with the anode.

15 Claims, 4 Drawing Sheets

(56) References Cited

OTHER PUBLICATIONS

Figure 1:
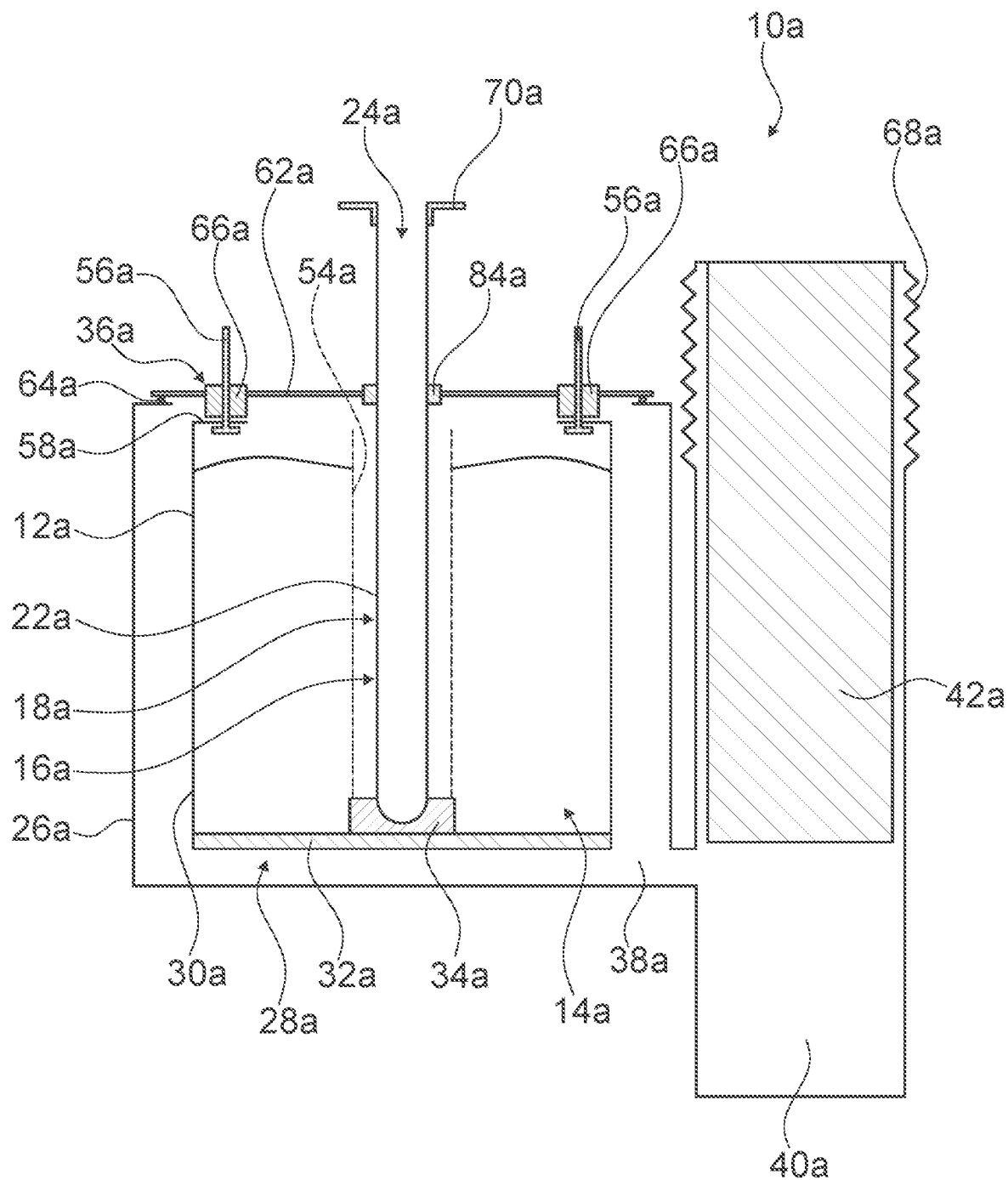

Martin A et al: "Yttria-stabilized zirconia as membrane material for electrolytic deoxidation of CaO—CaCl2 melts". Journal of Applied Electrochemistry, Kluwer Academic Publishers, DO, Bd. 40, Nr. 3, 11. Published Oct. 11, 2009, p. 533-542, XP019790158, ISSN:1572-8838.
W. Baukal: "Entwicklungsrichtungen in der Anwendung sauerstoffionen—leitender Festelektrolyte", Chemie Ingenieurtechnik., Bd. 41, Nr. 14,1. Published Jul. 1, 1969, p. 791-798 XP055684532, Weinheim; DE ISSN: 0009-286X, DOI: 10.1002/cite. 330411402 (and English machine translation.).

\* cited by examiner

ELECTROLYSIS APPARATUS FOR THE ELECTROLYTIC PRODUCTION OF OXYGEN FROM OXIDE-CONTAINING STARTING MATERIAL

CROSS REFERENCE TO RELATED APPLICATION

This application is based on and incorporates herein by reference European Patent Application No. 19205192.8 filed on Oct. 24, 2019.

PRIOR ART

The invention relates to an electrolysis apparatus for the electrolytic production of oxygen from oxide-containing starting material.

An electrolysis apparatus having at least one cathode which at least partly delimits a receiving region which in at least one operation state is configured for receiving the oxide-containing starting material and having at least one anode has already been proposed.

Furthermore, apparatuses for the production of metals and transition metals by direct reduction of solid or pulverulent oxide-containing starting materials, in particular, are known from GB 2 534 332 A, EP 3 161 189 B1 and EP 2 935 656 B1. Established electrolytic apparatuses and electrolytic methods, e.g. the FFC method, are aimed, in particular, at the chemical reduction of metal oxides and transition metal oxides for the production of pure metal, in particular for the production of titanium and tantalum from titanium oxide and tantalum oxide, respectively. The starting material is, in particular, in electrical contact with a cathode, with $CaCl_2$, LiCl and/or a mixture of $CaCl_2$ with some added CaO (<10%) typically being used as electrolyte. The anode typically consists of graphite or liquid aluminum and is a consumable part. At a working temperature of typically from 800° C. to 1000° C., a DC voltage is applied between cathode and anode. The starting material is reduced by the electrochemical processes and the anode is oxidized and converted into $CO_2$ or aluminum oxide, which is then obtained as unutilized waste product.

Apparatuses and methods in which a plurality of bipolar electrochemical cells are connected in series in an electrolyte bath are, in particular, used for the industrial production of metals. Continuous processes in which the electrolyte bath or the apparatus is typically open to its surroundings at two places for introduction and removal of freshly loaded cells or cell stacks are known from the documents EP 2 430 216 B1, EP 2 640 871 B1, EP 2 764 137 B1 and EP 2 640 872 B1. In addition, an integrated solution consisting of apparatuses and methods for the electrolytic production of metal powders and the direct further processing by means of additive manufacturing methods is known from WO2017/203245A1.

The objective of the invention is in particular to provide an electrolysis apparatus of the type in question having improved properties in respect of compactness and utility. The objective is achieved according to the invention by the features of claim 1, while advantageous embodiments and further developments of the invention are disclosed in the dependent claims.

Space flight applications and sustainable exploration of outer space require, in particular, technologies which make it possible to use resources available at the given place. Space-suitable technologies for producing oxygen, water and fuel from materials which are present on the Moon, on Mars or in and/or on asteroids are of interest. Technologies for producing oxygen and/or water from oxide-containing Moon rock, in particular lunar regolith, Mars rock, in particular Mars regolith, or asteroid rock are of particular interest. Here, "space-suitable" means, in particular, in relation to a reusable, low-wear/low-maintenance apparatus, a method without use of consumable materials and also apparatuses having a light and compact construction and/or a high energy efficiency and/or efficiency in terms of material.

Advantages of the Invention

The invention proceeds from an electrolysis apparatus for the electrolytic production of oxygen from oxide-containing starting material, having at least one cathode which at least partly delimits a receiving region which in at least one operation state is configured for receiving the oxide-containing starting material and having at least one anode.

It is proposed that the electrolysis apparatus comprise at least one selective oxygen pump which is at least partly realized integrally with the anode. The anode is preferably at least partly formed by the selective oxygen pump. The anode and the selective oxygen pump preferably have at least one common electrode. In particular, the selective oxygen pump has at least one electrode which at least additionally serves as the anode. The selective oxygen pump particularly preferably combines the functions of a pump and the anode. It would in principle also be conceivable for the anode to be formed by a plurality of electrodes, with, in particular, at least one of the electrodes acting so as to achieve a pump function of the selective oxygen pump.

In this context, an "electrolysis apparatus" is, in particular, an apparatus which in at least one operation state is configured for carrying out an electrolysis. The electrolysis apparatus is preferably configured for in particular recurring electrolytic production of oxygen from oxide-containing starting material. The electrolysis apparatus preferably has at least one electrolysis cell. In this context, an "electrolysis cell" is, in particular, a unit having at least two electrodes of which preferably one is realized as cathode and one is realized as anode and having a current circuit connecting the two electrodes. An electrolyte and/or at least one electrolyte-impregnated or ion-conducting membrane arranged between the two electrodes is/are preferably arranged between the at least two electrodes in at least one operation state. The electrolysis cell is preferably configured for carrying out a redox reaction. For the purposes of the present invention, an "electrolyte" is, in particular, an ion-conducting material, preferably in the form of a solution, for example an alkaline solution. The electrolyte is preferably based on ionic liquids. Various electrolytes which appear to be useful to a person skilled in the art are also conceivable, such as in particular calcium chloride, lithium chloride, sodium chloride, magnesium chloride in pure form or with additions of CaO, $Li_2O$, $Na_2O$, MgO, in each case in a proportion of, in particular, less than 10%.

Furthermore, a "selective oxygen pump" is in particular a pump unit which is selected, preferably for oxygen, in this context. This is preferably intended to mean, in particular, a pump unit by means of which oxygen can be selectively pumped. It is preferably, in particular, a pump unit by means of which oxygen can be selectively pumped out from a space regardless of a prevailing gas mixture, if present, and/or can be transferred into another space. The selective oxygen pump preferably has at least one barrier which is permeable to oxygen ions, in particular a membrane and/or particularly preferably a solid electrolyte. The solid electrolyte preferably has defined vacancies via which the oxygen ions can pass through the solid electrolyte. A corresponding selective oxygen pump is known, in particular, from EP 3 216 853 A1. The selective oxygen pump described in the document EP 3 216 853 A1 should therefore be seen, in particular, as part of the disclosure of the present invention. The statement that two units are "partly realized integrally" is intended to mean that, in particular, the units have at least one, in particular at least two, advantageously at least three, common elements which are a constituent part, in particular functionally important constituent part, of both units. For the present purposes, "realized integrally" means, in particular, joined by at least substance-to-substance bonding, for example by means of a welding process, an adhesive bonding process, a spraying process and/or another process which appears to be useful to a person skilled in the art, and/or advantageously implemented integrally, for example by production from one casting and/or by production in a one-component or multi-component injection method and advantageously from a single blank. The expression "configured" encompasses, in particular, specifically programmed, designed and/or equipped. The statement that an object is configured for a particular function means, in particular, that the object satisfies and/or performs this particular function in at least one use state and/or operation state.

An advantageously compact structure can, in particular, be achieved by means of the electrolysis apparatus of the invention. In particular, a number of components can be kept small. Furthermore, direct pumping-away of the oxygen produced at the anode can be achieved. The electrolysis apparatus allows, in particular, the direct electrolytic production and making available of oxygen from oxide-containing starting material. Furthermore, a compact construction, in particular, can be achieved by integration of an oxygen pump in the anode. Furthermore, it can be made possible, in particular, for no or only minimal degradation of the anode to occur during the process.

Furthermore, it is proposed that the at least one selective oxygen pump comprise at least one interior electrode which forms the anode. Preference is given to the interior electrode forming both an electrode of the selective oxygen pump and the electrode of the anode. In particular, the interior electrode forms both part of the anode and also part of the selective oxygen pump. The anode is preferably formed entirely by the interior electrode. The interior electrode is, in particular, arranged on a side of the oxygen pump facing away from the receiving region. In particular, the selective oxygen pump has at least in part a hollow-cylindrical basic shape, with the interior electrode being, in particular, formed on the inside. It would in principle be conceivable for the selective oxygen pump to have a further electrode, in particular an exterior electrode, in addition to the interior electrode. However, it would also be conceivable for an exterior electrode to be dispensed with. In the case of an embodiment without an exterior electrode, a pump voltage, in particular a DC voltage, is applied, in particular directly between the at least one interior electrode and the at least one cathode of the electrolysis apparatus. For operation of an embodiment having an additional exterior electrode, a pump voltage, in particular a DC voltage, which is less than the voltage between the interior electrode and the cathode is, in particular, additionally applied between the at least one interior electrode and the exterior electrode. In this way, it is possible, in particular, to keep the number of components small. Furthermore, direct pumping away of the oxygen produced can be achieved at the anode.

Furthermore, it is proposed that the at least one selective oxygen pump have at least one solid electrolyte, in particular a zirconium oxide element, which is configured for a selective transfer of oxygen from the receiving region into a pump space. The solid electrolyte is preferably configured for a selective transfer of oxygen ions, in particular oxygen anions, from the receiving region into the pump space. The solid electrolyte is preferably made of a zirconium oxide ceramic. Furthermore, a pumping rate of the selective oxygen pump is, in particular, particularly preferably influenced by an applied current intensity and/or a geometry, in particular a surface area, of the solid electrolyte. The pump power, i.e. a volume flow per unit time, and the achievable pressures, in particular both on a suction side and an output side, can preferably be set and/or configured by means of a pump flow, by an operating temperature and by the geometric dimensions of the selective oxygen pump. In this context, a "zirconium oxide ceramic" is, in particular, an engineering ceramic. In particular, the zirconium oxide ceramic is preferably formed by a nonmetallic mineral material. The zirconium oxide ceramic is, in particular, stabilized by means of other oxides, for example calcium oxide (CaO), magnesium oxide (MgO) and/or yttrium oxide ($Y_2O_3$). However, other ceramics and/or elements which appear to be useful to a person skilled in the art are in principle also conceivable, for example a ceramic and/or an element which comprises titanium oxide, vanadium oxide, niobium oxide and/or perovskite, where the oxides can in each case once again be stabilized by other oxides. A particularly reliable selective oxygen pump can in particular be provided thereby. Furthermore, an advantageously flexible pumping rate of the selective oxygen pump can be made possible thereby. Furthermore, a low exploitation of resources can be achieved thereby. It is possible to provide an operationally very robust, and thus preferred for use in space, electrolysis apparatus. In particular, it is possible to provide a selective oxygen pump free of movable parts. An electrically operating, in particular completely electrically operating, electrolysis apparatus can preferably be provided.

Furthermore, it is proposed that the at least one interior electrode be arranged directly on an inner side of the solid electrolyte. The solid electrolyte has, in particular, an at least approximately hollow-cylindrical shape, with the interior electrode being arranged on an interior surface of the solid electrolyte. The at least one interior electrode is, in particular, arranged on an inner side of the solid electrolyte facing toward the pump space. The interior electrode extends, in particular, over a major part of an inner side of the solid electrolyte. The interior electrode is preferably arranged between the solid electrolyte and the pump space. The interior electrode is, in particular, formed by a structured electrode having free places between the electrode material. In particular, the solid electrolyte is formed by a small zirconium oxide pipe which is closed at one end. The solid electrolyte preferably has a "test tube shape". An advantageously compact arrangement can, in particular, be achieved thereby. Furthermore, in particular, a number of separate components can be kept small.

It is also proposed that the electrolysis apparatus has a reactor housing and at least one material container, which in at least one operation state is configured for receiving the oxide-containing starting material, arranged in the reactor housing in at least one operation state. The material container is preferably at least partly, in particular in regions, permeable. In particular, the material container is, at least in regions, permeable to an electrolyte, in particular a liquid electrolyte. Preferably, an electrolyte for wetting the oxide-containing starting material can get through the material container into the receiving region of the material container. The material container preferably delimits the receiving region for receiving the oxide-containing starting material. The material container is preferably, in at least one operation state, especially at least during an electrolysis operation, accommodated in the reactor housing. The material container is preferably realized in such a way that it is removably inserted in the reactor housing. In particular, the material container can be removed completely from the reactor housing. The reactor housing preferably consists of a chemically resistant material, in particular a noble metal or a ceramic. Preferred materials are, in particular, stainless steel, platinum, tantalum, gold-plated metal or aluminum oxide, zirconium oxide, magnesium oxide, alumina-zirconia, yttrium-stabilized zirconia, aluminum titanate, mullite. An advantageous structure can, in particular, be achieved thereby. In particular, an advantageously compact arrangement can be achieved.

In addition, it is proposed that the at least one material container has at least one outer wall which is at least partly formed by the cathode. The material container is preferably formed by an at least approximately cylindrical container. Preference is given to a circumferential side wall of the material container being formed by the cathode at least in regions. The circumferential side wall of the material container is preferably formed entirely by the cathode. It is thereby possible to achieve, in particular, an advantageously compact arrangement. Furthermore, it is possible, in particular, to keep a number of separate components small. In particular, advantageous integration of the cathode can be achieved thereby.

Furthermore, it is proposed that the at least one material container has at least one bottom plate which has at least one electrically insulating alignment element for aligning the at least one selective oxygen pump relative to the cathode. The alignment element is preferably configured for centering the selective oxygen pump relative to the cathode. The alignment element is preferably configured for accommodating at least one end of the selective oxygen pump and aligning it in at least one plane. The alignment element preferably has a recess which is configured for accommodating at least one end of the selective oxygen pump. Furthermore, it would be conceivable for the entire bottom plate to be made of an electrically insulating material. In particular, the electrically insulating alignment element is configured for electrically insulating the selective oxygen pump from the cathode. In this way, it is possible to advantageously achieve, in particular, a defined alignment between the oxygen pump and the cathode.

Furthermore, it is proposed that the electrolysis apparatus has at least one coupling unit which is configured for a releasable connection of the material container with the reactor housing. The coupling unit preferably has at least one first coupling element which is at least partly fixed to the reactor housing and at least one second coupling element which is fixed to the material container. In particular, the first coupling element is at least fixed to a lid of the reactor housing. The reactor housing is preferably closed by means of the lid during operation. The material container can preferably be removed completely from the reactor housing and separated from the reactor housing, in particular for charging with the oxide-containing starting material, by means of the coupling unit. In this context, a "coupling unit" is, in particular, a unit which is configured for a closing, in particular releasable, connection of at least two components, with at least one of the components being formed by a container. A connection can, in particular, be effected by means of a plug connection, a rotational connection, a bayonet connection and/or another type of connection which appears to be useful to a person skilled in the art. The coupling unit is preferably at least partly formed by a bayonet connection and/or a keyhole connector. In this way, it is possible to achieve, in particular, advantageous separation and connection of the electrolysis apparatus. Furthermore, simple separation of the starting material from the electrolyte can be achieved with high electrolyte recovery when replacing the starting material. In particular, a washing operation can be dispensed with. Furthermore, it is possible to achieve, in particular, a reduced electrolyte loss by means of a closed reactor housing. In particular, there is no escape of electrolyte vapor from the reactor housing. In addition, this makes it possible to achieve energy-efficient operation as a result of a compact construction of the apparatus and optionally due to a decrease in the working temperature of the reactor by use of an electrolyte based on ionic liquids.

Furthermore, it is proposed that the electrolysis apparatus has a reactor housing which has at least one reactor space and at least one electrolyte reservoir which is connected with the reactor space and is configured for receiving an electrolyte. The electrolyte reservoir preferably adjoins the reactor space and/or is connected via a connecting conduit to the reactor space. The electrolyte is preferably formed by a liquid electrolyte. In this way, it is possible to achieve, in particular, an advantageously compact arrangement. It is furthermore possible, in particular, for a number of separate components to be kept small. In particular, advantageous integration of the electrolyte reservoir can be achieved thereby.

Furthermore, it is proposed that the electrolysis apparatus has at least one electrolyte displacer which is configured for displacing at least a portion of the electrolyte from the electrolyte reservoir into the reactor space in at least one operation state. The electrolyte displacer is preferably formed by a displacement piston which can be moved into the electrolyte reservoir or out from the electrolyte reservoir. In particular, displacement of the electrolyte can be controlled as a function of a position of the electrolyte displacer. The electrolyte displacer can preferably be moved electrically, for example by means of a spindle drive. The electrolyte displacer is preferably connected via a bellows to the reactor housing in order to allow sealed movement of the electrolyte displacer within the reactor housing. An advantageously rapid and simple filling of the reactor space with the electrolyte can be achieved thereby, in particular. In particular, an advantageously automated process can be achieved. In particular, an automated filling of the reactor space with the electrolyte can be achieved. This enables an advantageous application in outer space, in particular.

Furthermore, the invention proceeds from an oxygen generation system comprising the electrolysis apparatus for electrolytic production of oxygen from oxide-containing starting material. It is proposed that the oxygen generation system comprises at least one enrichment unit for enriching the oxide-containing starting material for the electrolysis apparatus and at least one oxygen processing unit which is configured for converting the oxygen produced by means of the electrolysis apparatus into water. The oxygen generation system is, in particular, preferably configured for production and subsequent storage and/or utilization of oxygen. The oxygen generation system forms, in particular, an intrinsically closed system. The oxygen generation system is preferably configured, in particular, for automatic production and storage and/or processing of oxygen. The enrichment unit is, in particular, configured for selection and enrichment of an advantageous chemical composition and particle size distribution of the starting material and provision of the amount of oxygen-containing starting material required for filling the receiving region. The enrichment unit preferably has at least one comminution element which is configured for processing the oxide-containing starting material. The oxygen processing unit is, in particular, configured for producing water from oxygen gas. This makes it possible to provide, in particular, an advantageous system for the production of oxygen. The oxygen generation system allows, in particular, direct electrolytic production and making available of oxygen from oxide-containing starting material.

It is also proposed that the oxygen processing unit comprises at least one fuel cell which is configured for converting the chemical reaction energy from the production of water into electric energy. The oxygen processing unit is, in particular, configured not only for the production of water but also for production of electric energy by means of a chemical reaction of the oxygen produced with hydrogen by means of the fuel cell. The electric energy generated can in turn be fed, in particular, to the electrolysis apparatus for carrying out the electrolysis. The water produced can, in particular, be stored in a water container. It is in this way possible to provide, in particular, an advantageously automated oxygen generation system. In particular, an energy consumption, in particular by the electrolysis apparatus, can be kept low. Furthermore, water can be produced advantageously. As an alternative, it would also be conceivable for a chemical reaction of the oxygen produced with hydrogen to form water to occur in a combustion chamber. The heat generated here could, in particular, be fed to the electrolysis apparatus, while the water produced is stored in a water container.

Furthermore, the invention proceeds from a method for operating the electrolysis apparatus, in which the oxide-containing starting material is brought into contact with an electrolyte in a leaching step in order to leach out oxygen ions, in particular oxygen anions. It is proposed that the method comprises a pumping step in which the leached-out oxygen ions are pumped by means of the selective oxygen pump from the receiving region into a pump space. The reactor housing and also the material container are preferably heated to a working temperature before the leaching step. The working temperature is, in particular, above an electrolyte melting point, preferably from 20° C. to 200° C. above the electrolyte melting point. The working temperature is particularly preferably in the range from 700° C. to 950° C. Furthermore, the electrolyte displacer is, in particular, moved downward before the leaching step, the electrolyte reservoir is emptied and the reactor space is filled with the electrolyte. The electrolyte preferably diffuses through a microstructured outer wall into the material container in the leaching step. In the pumping step, a DC voltage is, in particular, applied between the cathode and the anode. Advantageous oxygen generation can, in particular, be achieved thereby. Furthermore, pumping away of the oxygen produced at the anode can be achieved directly. In particular, direct electrolytic production and making available of oxygen from oxide-containing starting material is made possible. Furthermore, it can be made possible, in particular, for no or only minimal degradation of the anode to occur during the process.

Furthermore, it is proposed that the method comprises a neutralization step in which the oxygen ions are neutralized at an interior electrode of the selective oxygen pump and oxygen gas is produced. Neutralization of the cations of the cathode material preferably also occurs on the cathode side. It is possible to achieve, in particular, advantageous neutralization in this way. Furthermore, it would also be conceivable for the selective oxygen pump to have an integrated oxygen sensor with the electric potential between an interior electrode and an exterior electrode of the integrated oxygen sensor being read off for process control. The oxygen produced can, in particular, subsequently be discharged via a vacuum-tight gas connection of the selective oxygen pump and passed, for example, to an oxygen reservoir for storage.

A production of oxygen is followed by, in particular, a separation of electrolyte from the oxide-containing starting material and recycling of the starting material. For this purpose, the electrolyte displacer is, in particular, moved upward. In this way, the electrolyte reservoir is filled with electrolyte and the reactor space is emptied. The electrolyte within the material container is, in particular, separated from the used-up starting material by means of a heating step and driven out from the material container. The separation temperature is, in particular, above an electrolyte melting point, preferably from 100° C. to 300° C. above the electrolyte melting point.

Furthermore, it is proposed that performance of the method is carried out under conditions of reduced or increased gravitational force. This method is preferably to be employed in space, for example at μg in a spacecraft, in a process in a spacecraft at accelerations of from $10^{-6}$×g to 10×g, on a planet such as Mars and/or on a satellite such as the Moon. The g values are to be interpreted, in particular, as being on a planet and/or an asteroid or in a flying spacecraft. However, a g value can in principle be increased drastically, for example to 100×g, by engineering methods. For example, a plant and/or a reactor can be subjected to artificial process acceleration which deviates from the indicated g values. The expression "conditions of reduced gravitational force" should be interpreted, in particular, as referring to conditions where a gravitational effect of not more than 0.9×g, advantageously down to a minimum of $1*10^{-3}$×g, preferably down to a minimum of $1*10^{-6}$×g and particularly preferably down to a minimum of $1*10^{-6}$×g, is effective. Furthermore, the expression "conditions of increased gravitational force" should be interpreted, in particular, to refer to conditions under which a gravitational effect of at least 1.1×g, preferably up to a maximum of 10×g, is effective. The gravitational effect can be produced by gravity and/or artificially by means of acceleration. The g values can in principle be increased drastically by engineering methods. The symbol "g" refers to the value of the acceleration under gravity on the Earth of 9.81 m/s$^2$. The method can advantageously be employed in life sustaining systems and/or in air conditioning plants in space, for example in space vehicles, habitations in space and/or manned systems.

The electrolysis apparatus of the invention, the oxygen generation system and the method are here not intended to be restricted to the above-described application and embodiment. In particular, the electrolysis apparatus of the invention, the oxygen generation system of the invention and also the method of the invention can have a number which deviates from a number mentioned herein of individual elements, components and units and also method steps in order to perform a function described herein. In addition, in the case of value ranges indicated in the present disclosure, values lying within the limits indicated should also be interpreted as having been disclosed and being usable in any way.

DRAWINGS

Further advantages can be derived from the following description of the drawings. Two working examples of the invention are presented in the drawings. The drawings, the description and the claims contain numerous features in combination. A person skilled in the art will advantageously also look at the features individually and combine them in purposeful further combinations.

Figure 2:
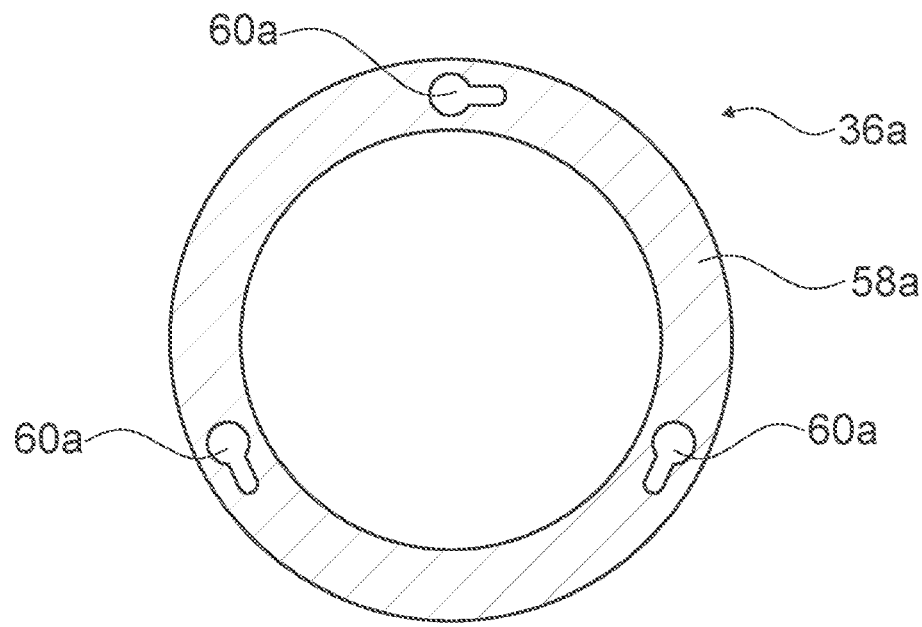
Figure 3:
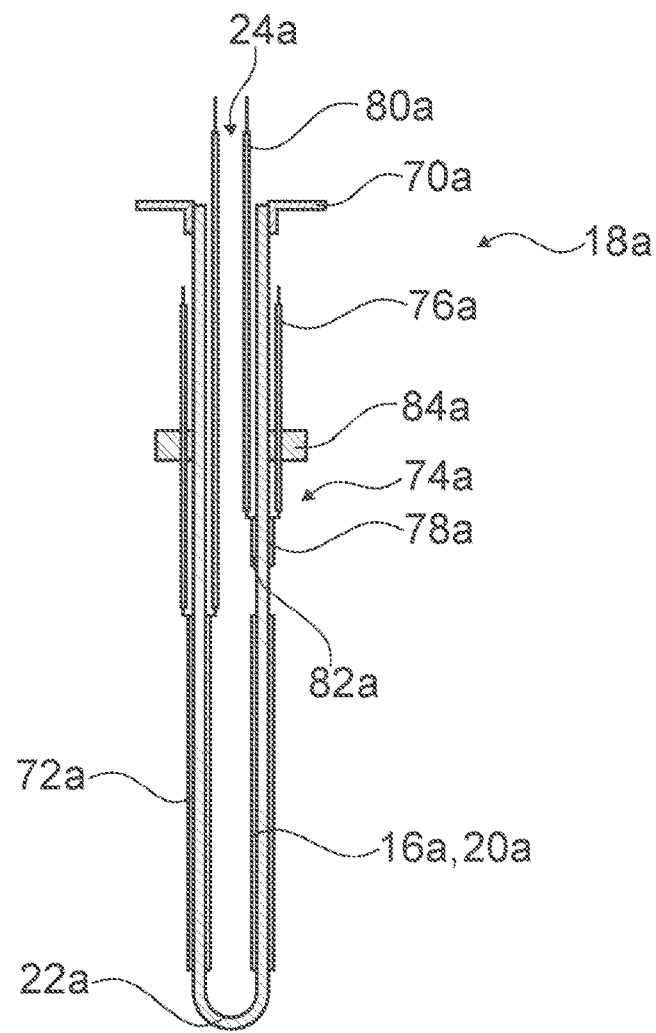
Figure 4:
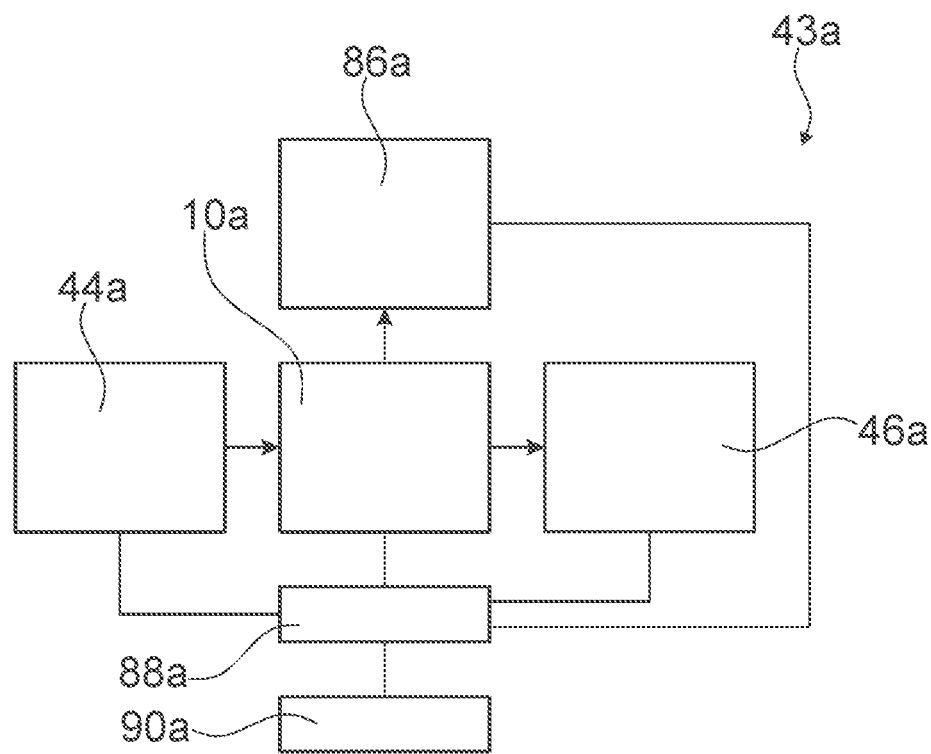
Figure 5:
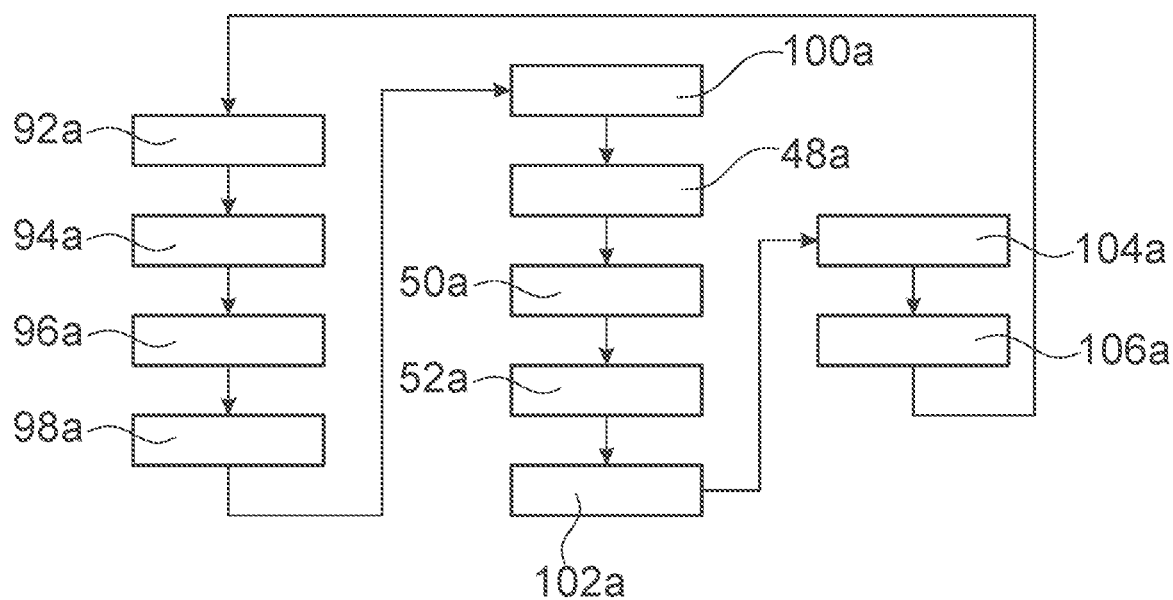
Figure 6:
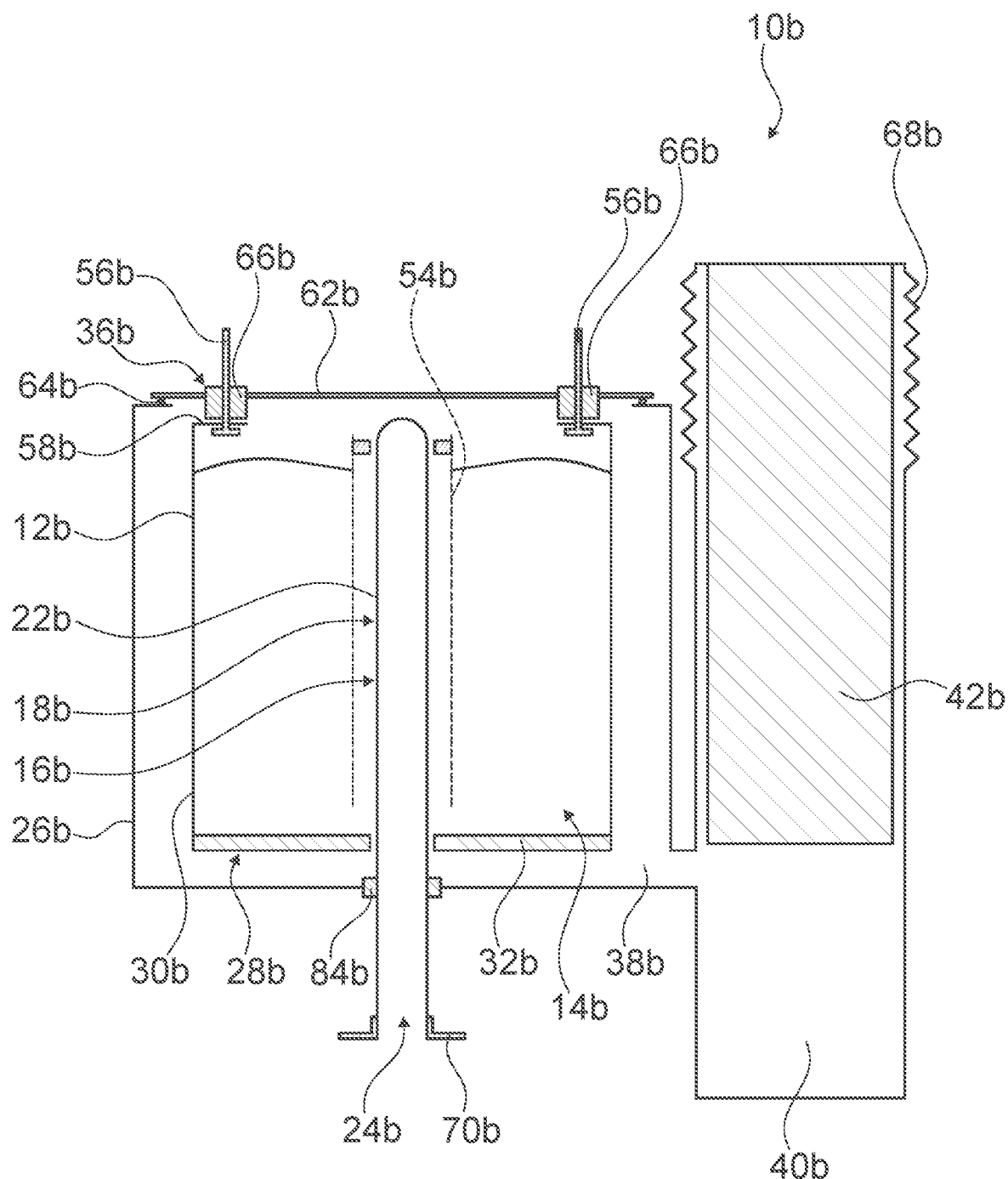

The drawings show:

FIG. 1 an electrolysis apparatus according to the invention having a reactor housing, a material container, a cathode, an anode and a selective oxygen pump in a schematic depiction, FIG. 2 a second coupling element of a coupling unit of the electrolysis apparatus of the invention in a schematic depiction, FIG. 3 the selective oxygen pump having a solid electrolyte, an interior electrode and an exterior electrode in a schematic depiction, FIG. 4 an oxygen generation system comprising the electrolysis apparatus of the invention, having an enrichment unit and an oxygen processing unit in a schematic depiction, FIG. 5 a schematic flow diagram of a method for operating the electrolysis apparatus of the invention and FIG. 6 an alternative electrolysis apparatus according to the invention having a reactor housing, a material container, a cathode, an anode and a selective oxygen pump in a schematic depiction.

DESCRIPTION OF THE WORKING EXAMPLES

FIG. 1 shows an electrolysis apparatus 10a for the electrolytic production of oxygen from oxide-containing starting material. The oxide-containing starting material is preferably a metal oxide, a transition metal oxide and/or an oxide of rare earths, with particular preference being given to oxides of iron, copper, titanium, tantalum, aluminum, magnesium, silicon, vanadium, chromium, manganese, cobalt, nickel, tungsten, lanthanides in pure form or in mixed form, in particular as ilmenite, lunar regolith or Mars regolith. The oxide-containing starting material is preferably present in powder form. The particle size is, in particular, in a range from 0.1 µm to 3.0 mm, preferably from 1 µm to 2.5 mm and particularly preferably from 1.0 µm to 2.0 µm. The electrolysis apparatus 10a is intended for use under conditions of reduced or increased gravitational force. The electrolysis apparatus 10a is configured for use in space.

The electrolysis apparatus 10a has a reactor housing 26a. The reactor housing 26a consists of a chemically resistant material, in particular composed of a noble metal or a ceramic. Preferred materials are stainless steel, platinum, tantalum, gold-plated metal or aluminum oxide, zirconium oxide, magnesium oxide, alumina-zirconia, yttrium-stabilized zirconia, aluminum titanate, mullite. However, other materials which appear to be useful to a person skilled in the art are also conceivable. The reactor housing 26a has a reactor space 38a and an electrolyte reservoir 40a which is connected to the reactor space 38a and is configured for receiving an electrolyte, in particular a liquid electrolyte. The electrolyte reservoir 40a directly adjoins the reactor space 38a and is connected directly via a connecting section to the reactor space 38a. The reactor space 38a is formed by a cylindrical space. However, another shape which appears to be useful to a person skilled in the art would in principle also be conceivable. The reactor housing 26a has an opening via which the reactor space 38a can be made accessible on an upper side of the reactor space 38a. The opening in the reactor housing 26a is, in particular, closed during operation. The reactor housing 26a has a lid 62a which is configured for closing the reactor housing 26a. The lid 62a is formed by a chemically resistant and removable lid 62a. The lid 62a is placed via a chemically resistant seal 64a on top of the remaining reactor housing 26a.

The electrolyte reservoir 40a is filled with an electrolyte in at least one operation state. The electrolyte is based on ionic liquids. Various electrolytes which appear to be useful to a person skilled in the art are conceivable, in particular calcium chloride, lithium chloride, sodium chloride, magnesium chloride in pure form or with additions of CaO, $Li_2O$, $Na_2O$, MgO, in each case in a proportion which is, in particular, less than 10%.

The electrolysis apparatus 10a further comprises an electrolyte displacer 42a. The electrolyte displacer 42a is configured for displacing the electrolyte from the electrolyte reservoir 40a into the reactor space 38a in an operation state. The electrolyte displacer 42a is formed by a cylindrical piston. The electrolyte displacer 42a consists of a chemically resistant material. The electrolyte displacer 42a is formed by a displacer piston which can be moved into the electrolyte reservoir 40a or out from the electrolyte reservoir 40a. The electrolyte displacer 42a is, by way of example, able to be moved electrically by means of a spindle drive. The electrolyte displacer 42a is sealed against the reactor housing 26a. The electrolyte displacer 42a is connected via a bellows 68a to the reactor housing 26a in order to allow sealed movement of the electrolyte displacer 42a within the reactor housing 26a. The electrolyte displacer 42a can in this way be moved, in particular, from outside the reactor housing 26a. Displacement of the electrolyte can be controlled as a function of a position of the electrolyte displacer 42a. The electrolyte displacer 42a preferably has at least two operating settings. In a first operating setting, the electrolyte displacer 42a is in an upper maximum position, so that the electrolyte reservoir 40a is completely filled with the electrolyte. In a second operating position, the electrolyte displacer 42a is in a lower maximum position in which the electrolyte displacer 42 is located in the electrolyte reservoir 40a so that the major portion of the electrolyte has been displaced from the electrolyte reservoir 40a.

Furthermore, the electrolysis apparatus 10a has a material container 28a which in at least one operation state is arranged in the reactor housing 26a and is configured, in at least one operation state, for receiving the oxide-containing starting material. The material container 28a delimits a receiving region 14a for receiving the oxide-containing starting material. The material container 28a is formed by a cylindrical container. The material container 28a has a circular bottom plate 32a and a hollow-cylindrical outer wall 30a. The outer wall 30a is joined directly to the bottom plate 32a. However, another shape of the material container 28a which appears to be useful to a person skilled in the art would in principle also be conceivable. The material container 28a is made permeable in regions. The outer wall 30a of the material container 28a is permeable to the liquid electrolyte. The electrolyte can get through the material container 28a into the receiving region 14a of the material container 28a in order to wet the oxide-containing starting material. The material container 28a is accommodated in the reactor housing 26a, at least during an electrolysis operation. The material container 28a is preferably inserted in a removable manner into the reactor housing 26a, with the material container 28a being able to be removed completely from the reactor housing 26a.

Furthermore, the electrolysis apparatus 10a has a cathode 12a which partly delimits the receiving region 14a which in at least one operation state is configured for receiving the oxide-containing starting material. The outer wall 30a of the material container 28a is formed by the cathode 12a. The circumferential outer wall 30a of the material container 28a is formed entirely by the cathode 12a. The cathode 12a is integrated into the material container 28a. The outer wall 30a consists of a chemically resistant and electrically conductive material, for example stainless steel, platinum, tantalum and/or gold-plated metal. The outer wall 30a of the material container 28a contains a microstructure which is permeable to the electrolyte. The bottom plate 32a is electrically insulating. The bottom plate 32a consists, in particular, of ceramic, with particular preferred materials being, in particular, aluminum oxide, zirconium oxide, magnesium oxide, zirconia, yttrium-stabilized zirconia, aluminum titanate and/or mullite. The material container 28a also has an inner wall 54a. The inner wall 54a has a hollow-cylindrical configuration. The inner wall 54a is joined to the bottom plate 32a. The inner wall 54a is concentric with the outer wall 30a. The inner wall 54a delimits the receiving region 14a for receiving the oxide-containing starting material on the inside. The receiving region 14a for receiving the oxide-containing starting material extends between the inner wall 54a and the outer wall 30a. The inner wall 54a is formed by a permeable inner wall. The inner wall 54a is formed, in particular, by a sieve or mesh, a metal foam and/or a porous ceramic. The inner wall 54a has, in particular, a hole size of from 1 µm to 200 µm, preferably from 1 µm to 50 µm.

The electrolysis apparatus 10a also has a coupling unit 36a. The coupling unit 36a is configured for a releasable connection of the material container 28a with the reactor housing 26a. The coupling unit 36a is formed at least partly by a keyhole connector. The coupling unit 36a has at least one first coupling element 56a which is fixed to the reactor housing 26a. The coupling unit 36a has a plurality of first coupling elements 56a. The first coupling elements 56a are joined to the lid 62a of the reactor housing 26a. The first coupling elements 56a are formed by electrically conductive holders which at their lower end each have a holding plate. The first coupling elements 56a preferably consist of a noble metal, particularly preferably stainless steel, platinum, tantalum, and/or gold-plated metal. The first coupling elements 56a are coupled via electrically insulating pass-throughs 66a to the lid 62a. The pass-throughs 66a preferably consist of ceramic, particular preferably of aluminum oxide, zirconium oxide, magnesium oxide, zirconia, yttrium-stabilized zirconia, aluminum titanate and/or mullite. The coupling unit 36a additionally has a second coupling element 58a which is fixed to the material container 28a. The second coupling element 58a is fixed to the outer wall 30a of the material container 28a. The second coupling element 58a is formed by a ring which has a plurality of recesses 60a, in particular keyhole-shaped recesses 60a, distributed in the circumferential direction (FIG. 2). The first coupling elements 56a are configured for being hung in the recesses 60a, with an electrical connection in particular, additionally being established by the hanging-in. The material container 28a is preferably able to be removed completely from the reactor housing 26a by means of the coupling unit 36a in order to be filled with the oxide-containing starting material.

Furthermore, the electrolysis apparatus 10a has a selective oxygen pump 18a. The selective oxygen pump 18a is held in the lid 62a via an electrically insulating pass-through 84a. The selective oxygen pump 18a projects into a region within the receiving region 14a which is delimited by the inner wall 54a. The selective oxygen pump 18a is separated by the inner wall 54a from the receiving region 14a. The selective oxygen pump 18a extends concentrically with the outer wall 30a and the inner wall 54a. The pass-through 84a preferably consists of ceramic, particularly preferably of aluminum oxide, zirconium oxide, magnesium oxide, zirconia, yttrium-stabilized zirconia, aluminum titanate and/or mullite. The selective oxygen pump 18a is formed by an electrochemical oxygen pump. The selective oxygen pump 18a comprises a solid electrolyte 22a which is configured for a selective transfer of oxygen from the receiving region 14a into a pump space 24a. The solid electrolyte 22a is formed by a zirconium oxide element. The solid electrolyte 22a is formed by a zirconium oxide ceramic. The solid electrolyte 22a of the selective oxygen pump 18a is formed by a doped zirconium oxide element. The zirconium oxide element is doped with yttrium oxide ($Y_2O_3$). However, it would in principle also be conceivable for the solid electrolyte 22a to be formed by an undoped zirconium oxide element. The solid electrolyte 22a is for this purpose formed by a small zirconium oxide tube which is closed at one side, in particular at a bottom side. The solid electrolyte 22a has a hollow-cylindrical basic shape. The solid electrolyte 22a has a "test tube shape". However, another shape which appears to be useful to a person skilled in the art would in principle also be conceivable. For example, a flat configuration of the solid electrolyte 22a is also be conceivable. The solid electrolyte 22a forms a hollow space which forms the pump space 24a. A closed side of the solid electrolyte 22a projects into the receiving region 14a. An open side of the solid electrolyte 22a projects from the reactor housing 26a. The selective oxygen pump 18a has a gas connection 70a, in particular a vacuum-tight gas connection, at the open side of the solid electrolyte 22a. The gas connection 70a is, in particular, for coupling the selective oxygen pump 18a to a gas conduit. The solid electrolyte 22a acts as selective oxygen pump which transports oxygen only when the solid electrolyte 22a is at operating temperature and a pump current flows between an inner side and an outer side of the solid electrolyte 22a. The selective oxygen pump 18a is here configured for electrical reduction of at least one gas (FIG. 3).

Furthermore, the selective oxygen pump 18a has an interior electrode 20a. The interior electrode 20a is arranged on a side of the oxygen pump 18a facing away from the receiving region 14a. The interior electrode 20a is arranged directly on an inner side of the solid electrolyte 22a. The solid electrolyte 22a has an approximately hollow-cylindrical shape, with the interior electrode 20a being arranged on an inner surface of the solid electrolyte 22a. The interior electrode 20a is arranged on an inner side of the solid electrolyte 22a facing the pump space 24a. The interior electrode 20a extends over a substantial part of an inner side of the solid electrolyte 22a. The interior electrode 20a is arranged between the solid electrolyte 22a and the pump space 24a. The interior electrode 20a is formed by a structured electrode with free spaces between the electrode material. The interior electrode 20a consists at least partially of platinum. The selective oxygen pump 18a also has an exterior electrode 72a. It would also be conceivable for an exterior electrode 72a to be omitted. In one embodiment without an exterior electrode 72a, a pump voltage, in particular a DC voltage, is applied, in particular directly, between the interior electrode 20a and the cathode 12a of the electrolysis apparatus 10a. For operation of the embodiment with the exterior electrode 72a, a pump voltage, in particular a DC voltage, which is less than the voltage between the interior electrode 20a and the cathode 12a is additionally applied between the interior electrode 20a and the exterior electrode 72a. The exterior electrode 72a is formed by a structured electrode having free spaces between the electrode material. The exterior electrode 72a consists at least partly of platinum. The exterior electrode 72a is arranged on a side of the oxygen pump 18a facing the receiving region 14a. The exterior electrode 72a is arranged directly on an outside of the solid electrolyte 22a. The exterior electrode 72a is arranged on an outer side of the solid electrolyte 22a that faces away from the pump space 24a. The interior electrode 20a and/or the exterior electrode 72a can additionally serve as catalyst for dissociation of oxygen-containing gases, for example $SO_2$, $CO_2$, NO, $NO_2$ or $O_3$, and/or for a selective removal of oxygen. In particular, other electrode materials such as palladium, rhodium, cobalt, iridium and/or nickel are also conceivable (FIG. 3).

The interior electrode 20a is connected via an electrically insulated line to an energy source which is not shown. The exterior electrode 72a is connected via an electrically insulated and chemically resistant line to an energy source which is not shown. The energy source forms a voltage source for the interior electrode 20a and the exterior electrode 72a and also the cathode 12a.

The electrolysis apparatus 10a also has a measurement unit 74a. The measurement unit 74a is configured for measuring a voltage difference between two sides of the selective oxygen pump 18a. The measurement unit 74a is configured for measuring a voltage difference between a first side of the selective oxygen pump 18a facing the receiving region 14a and a second side facing the pump space 24a. For this purpose, the measurement unit 74a has a voltage meter. The measurement unit 74a is connected via a first line 76a to a first measuring electrode 78a of the selective oxygen pump 18a. The first measuring electrode 78a is arranged on an outer side of the solid electrolyte 22a. The first measuring electrode 78a is made chemically resistant. The first measuring electrode 78a consists of platinum. Furthermore, the measurement unit 74a is connected via a line 80a to a second measuring electrode 82a. The second measuring electrode 82a is arranged on an inner side of the solid electrolyte 22a facing the pump space 24a. The second measuring electrode 82a consists of platinum. The measuring electrodes 78a, 82a have a ring-like configuration and extend circumferentially along the solid electrolyte 22a. The measurement unit 74a is configured for measuring a voltage difference between the first measuring electrode 78a and the second measuring electrode 82a (FIG. 3).

Furthermore, the electrolysis apparatus 10a has an anode 16a. The anode 16a is partly realized integrally with the selective oxygen pump 18a. The interior electrode 20a of the selective oxygen pump 18a forms the anode 16a. The selective oxygen pump 18a combines the function of a pump and the anode 16a. The interior electrode 20a forms both an electrode of the selective oxygen pump 18a and the electrode of the anode 16a.

The bottom plate 32a of the material container 28a also has an electrically insulating alignment element 34a for aligning the selective oxygen pump 18a relative to the cathode 12a. The alignment element 34a is configured for centering the selective oxygen pump 18a relative to the cathode 12a. The alignment element 34a is configured for accommodating the closed end of the solid electrolyte 22a of the selective oxygen pump 18a and aligning it in at least one plane. The alignment element 34a has a recess which is configured for accommodating at least one end of the selective oxygen pump 18a. The alignment element 34a preferably consists of an electrically insulating ceramic, particularly preferably of aluminum oxide, zirconium oxide, magnesium oxide, zirconia, yttrium-stabilized zirconium, aluminum titanate and/or mullite.

In addition, FIG. 4 schematically shows an oxygen generation system 43a. The oxygen generation system 43a is configured for producing and subsequently storing and/or utilizing oxygen. The oxygen generation system 43a forms an intrinsically closed system. The oxygen generation system 43a comprises the electrolysis apparatus 10a for the electrolytic production of oxygen from oxide-containing starting material. Furthermore, the oxygen generation system 43a has an enrichment unit 44a for enrichment of the oxygen-containing starting material for the electrolysis apparatus 10a. The enrichment unit 44a is configured for selecting and enriching an advantageous chemical composition and particle size distribution of the starting material and for making available the amount of oxide-containing starting material required for filling the receiving region 14a of the electrolysis apparatus 10a. The enrichment unit 44a is connected directly to the electrolysis apparatus 10a. The enrichment unit 44a has, by way of example, at least one comminution element which is configured for processing the oxide-containing starting material.

The oxygen generation system 43a comprises an oxygen processing unit 46a. The oxygen processing unit 46a is configured for storing oxygen which has been produced and/or for producing water from oxygen gas. The oxygen processing unit 46a is, by way of example, configured for converting the oxygen produced by means of the electrolysis apparatus 10a into water. The oxygen processing unit 46a is connected via a gas conduit to the selective oxygen pump 18a of the electrolysis apparatus 10a. The oxygen processing unit 46a is supplied with oxygen gas from the electrolysis apparatus 10a. The oxygen processing unit 46a is configured for producing water from oxygen gas. The oxygen processing unit 46a comprises a fuel cell which is configured for converting the chemical reaction energy from the production of water into electric energy. The oxygen processing unit 46a is configured not only for producing water but also for producing electric energy by means of a chemical reaction of the oxygen produced with hydrogen by means of the fuel cell. The electric energy generated can in turn be fed to the electrolysis apparatus 10a for performing the electrolysis. The water produced can, in particular, be stored in a water container. As an alternative, it would also be conceivable for a chemical reaction of the oxygen produced with hydrogen to form water to occur in a combustion chamber. The heat produced here could, in particular, be introduced into the electrolysis apparatus 10a, while the water produced is stored in a water container.

The oxygen generation system 43a further comprises a receiving unit 86a for used-up starting material. The receiving unit 86a is coupled directly to the electrolysis apparatus 10a. The receiving unit 86a is configured for receiving and storing reduced starting material from the material container 28a. The receiving unit 86a is configured for storing the reduced starting material under an inert gas atmosphere or under reduced pressure until further processing. In this way, a risk of inflammability can be kept low.

Furthermore, the oxygen generation system 43a has a local control unit 88a for controlling and regulating the processes of the oxygen generation system 43a and also a remote system controller 90a for an actuation of the control unit 88a.

Preference is given to at least the electrolysis apparatus 10a, the enrichment unit 44a, the oxygen processing unit 46a, the receiving unit 86a and the control unit 88a being arranged next to one another and/or in a housing and/or on the same site. In this way, a compact and easy mode of construction can be achieved.

FIG. 5 shows a schematic flow diagram of a method for operating the electrolysis apparatus 10a. In the method, the receiving region 14a of the material container 28a is emptied and filled before direct electrolytic production of oxygen. For this purpose, the lid 62a is opened and removed together with the material container 28a from the reactor housing 26a in a first method step 92a of the method. Subsequently, in a further method step 94a, the material container 28a is turned until the round subregions of the recesses 60a of the second coupling element 58a are located above the first coupling elements 56a and the material container 28a can be separated from the lid 62a. In a further method step 96a, the material container 28a is then emptied and filled with starting material. Subsequently, the material container 28a is, in a further method step 98a, reinstalled on the lid 62a and the lid 62a is fastened in a vacuum-tight manner on the reactor housing 26a by means of the seal 64a.

Direct electrolytic production of oxygen is subsequently carried out in the method. For this purpose, the reactor housing 26a and also the material container 28a are heated to working temperature in a first method step 100a of the direct electrolytic production of oxygen. The working temperature is above an electrolyte melting point, preferably from 20° C. to 200° C. above the electrolyte melting point. The working temperature is particularly preferably in the range from 700° C. to 950° C. Furthermore, the electrolyte displacer 42a is moved downward in the first method step 100a of the direct electrolytic production of oxygen, the electrolyte reservoir 40a is emptied and the reactor space 38a is filled with the electrolyte. In a subsequent leaching step 48a, the oxide-containing starting material is brought into contact with the electrolyte in order to leach out oxygen ions, in particular oxygen anions. For this purpose, the electrolyte diffuses in the leaching step 48a through a microstructured outer wall 30a into the material container 28a. This is followed by a pumping step 50a of the method, in which the leached-out oxygen ions are pumped by means of the selective oxygen pump 18a from the receiving region 14a into the pump space 24a. In the pumping step 50a, a DC voltage is applied between the cathode 12a and the anode 16a or the interior electrode 20a. In the embodiment with additional exterior electrode 72a shown, a further DC voltage which is less than the voltage between the interior electrode 20a and the material container 28a is applied between the interior electrode 20a and the exterior electrode 72a. The pumping step 50a is monitored, in particular, by means of the measurement unit 74a for the purposes of process control. This is followed by a neutralization step 52a in which the oxygen ions are neutralized at the interior electrode 20a of the selective oxygen pump 18a and oxygen gas is produced. Furthermore, neutralization of the cations of the cathode material occurs on the cathode side in the neutralization step 52a. The oxygen produced is subsequently discharged via the vacuum-tight gas connection 70a in a further method step 102a of the method, for example for storage in an oxygen reservoir.

The direct electrolytic production of oxygen is followed, in particular, by removal of electrolyte from the oxide-containing starting material and recycling of the starting material. For this purpose, the electrolyte displacer 42a is moved upward in a first method step 104a. In this way, the electrolyte reservoir 40a is filled with electrolyte and the reactor space 38a is emptied. The electrolyte within the material container 28a is subsequently separated from the used-up starting material by means of a heating step 106a and driven out from the material container 28a. The separation temperature is, in particular, above an electrolyte melting point, preferably from 100° C. to 300° C. above the electrolyte melting point.

In an alternative embodiment, the electrolyte consists, in particular, of an ionic liquid having a melting point in the range from 50° C. to 500° C., preferably from 100° C. to 350° C., while the solid electrolyte 22a of the oxygen pump 18a consists of a low-temperature oxygen ion conductor. The electrolyte particularly advantageously consists of a mixture of polyethylene glyme and butylpyrrolidinium bis (trifluoromethanesulfonyl)imide, acetylcholine and water, N-butyl-N-methylpyrrolidinium bis(trifluoromethanesulfonyl)imide. The solid electrolyte 22a preferably consists of bismuth-iridium ($BiI_3$), doped cerium oxide and/or lanthanum-strontium-gallium-magnesium mixed oxide.

A further working example of the invention is shown in FIG. 6. The following descriptions are restricted essentially to the differences between the working examples; as regards components, features and functions which remain the same, reference may be made to the description of the working example of FIGS. 1 to 5. To distinguish the working examples, the letter a in the reference numerals of the working example in FIGS. 1 to 5 has been replaced by the letter b in the reference numerals of the working example of FIG. 6. As regards components having the same designation, especially components bearing the same reference numerals, reference may in principle also be made to the drawings and/or the description of the working example of FIGS. 1 to 5.

FIG. 6 shows an electrolysis apparatus 10b for the electrolytic production of oxygen from oxide-containing starting material. The electrolysis apparatus 10b has a reactor housing 26b. The reactor housing 26b has an opening on an upper side of a reactor space 38b, via which opening the reactor space 38b can be made accessible. The reactor housing 26b has a lid 62b which is configured for closing the reactor housing 26b.

Furthermore, the electrolysis apparatus 10b has a material container 28b which in at least one operation state is arranged in the reactor housing 26b and is configured, in at least one operation state, for receiving the oxide-containing starting material.

Furthermore, the electrolysis apparatus 10b has a selective oxygen pump 18b. The selective oxygen pump 18b is held in the reactor housing 26b by means of an electrically insulating pass-through 84b. The selective oxygen pump 18b projects from the bottom into a region delimited by an inner wall 54b within a receiving region 14b. The selective oxygen pump 18b is separated by means of the inner wall 54b from the receiving region 14b. The selective oxygen pump 18b extends concentrically to an outer wall 30b and the inner wall 54b. The pass-through 84b is located in a bottom of the reactor space 38b and preferably consists of ceramic, particularly preferably of aluminum oxide, zirconium oxide, magnesium oxide, zirconia, yttrium-stabilized zirconia, aluminum titanate and/or mullite. The selective oxygen pump 18b has a solid electrolyte 22b which is configured for a selective transfer of oxygen from the receiving region 14b into a pump space 24b. The solid electrolyte 22b is formed by a zirconium oxide element. The solid electrolyte 22b is for this purpose formed by a small zirconium oxide tube which is closed at its upper end. The solid electrolyte 22b has a "test tube shape". The selective oxygen pump 18b is installed in a fixed position in the reactor housing 26b and is not taken out together with the material container 28b to allow filling. The structure allows emptying and filling of the material container 28b without the selective oxygen pump 18b being removed from the reactor housing 26b.

LIST OF REFERENCE NUMERALS

10 Electrolysis apparatus
12 Cathode
14 Receiving region
16 Anode
18 Oxygen pump
20 Interior electrode
22 Solid electrolyte
24 Pump space
26 Reactor housing
28 Material container
30 Outer wall
32 Bottom plate
34 Alignment element
36 Coupling unit
38 Reactor space
40 Electrolyte reservoir
42 Electrolyte displacer
43 Oxygen generation system
44 Enrichment unit
46 Oxygen processing unit
48 Leaching step
50 Pumping step
52 Neutralization step
54 Inner wall
56 Coupling element
58 Coupling element
60 Recess
62 Lid
64 Seal
66 Pass-through
68 Bellows
70 Gas connection
72 Exterior electrode
74 Measurement unit
76 Line
78 Measuring electrode
80 Line
82 Measuring electrode
84 Pass-through
86 Receiving unit
88 Control unit
90 Remote system controller
92 Method step
94 Method step
96 Method step
98 Method step
100 Method step
102 Method step
104 Method step
106 Heating step

The invention claimed is:

1. An electrolysis apparatus for the electrolytic production of oxygen from oxide-containing starting material, having at least one cathode which at least partly delimits a receiving region that in at least one operation state is configured for receiving the oxide-containing starting material, and having at least one anode, comprising
at least one selective oxygen pump which is at least partly realized integrally with the anode; and
at least one container for material having at least one bottom plate which has at least one electrically insulating alignment element for an alignment of the at least one selective oxygen pump relative to the cathode.

2. The electrolysis apparatus as claimed in claim 1, wherein
the at least one selective oxygen pump has at least one interior electrode which forms the anode.

3. The electrolysis apparatus as claimed in claim 1, wherein
the at least one selective oxygen pump has at least one solid electrolyte, which is configured for a selective transfer of oxygen from the receiving region into a pump space.

4. The electrolysis apparatus as claimed in claim 2, wherein
the at least one interior electrode is arranged directly on an inner side of the solid electrolyte.

5. The electrolysis apparatus as claimed in claim 1, further comprising
a reactor housing, wherein the at least one container for material is configured such that in at least one operation state the at least one container is arranged in the reactor housing and in at least one operation state the at least one container is configured for receiving the oxide-containing starting material.

6. The electrolysis apparatus as claimed in claim 5, wherein
the at least one material container has at least one outer wall which is at least partly formed by the cathode.

7. The electrolysis apparatus as claimed in claim 5, further comprising
at least one coupling unit which is configured for a releasable connection of the container for material with the reactor housing.

8. The electrolysis apparatus as claimed in claim 1, further comprising
a reactor housing which has at least one reactor space and at least one electrolyte reservoir which is connected with the reactor space and is configured for receiving an electrolyte.

9. The electrolysis apparatus as claimed in claim 8, further comprising
at least one electrolyte displacer which is configured for displacing at least a portion of the electrolyte from the electrolyte reservoir into the reactor space in at least one operation state.

10. An oxygen generation system comprising the electrolysis apparatus as claimed in claim 1, for the electrolytic production of oxygen from oxide-containing starting material, further comprising
at least one enrichment unit for an enrichment of the oxide-containing starting material for the electrolysis apparatus and at least one oxygen processing unit which is configured for converting the oxygen produced by means of the electrolysis apparatus into water.

11. The oxygen generation system as claimed in claim 10, wherein
the oxygen processing unit comprises at least one fuel cell, which is configured for converting the chemical reaction energy from the production of water into electric energy.

12. A method for operating the electrolysis apparatus as claimed in claim 1, in which the oxide-containing starting material is brought into contact with an electrolyte in order to leach out oxygen ions in a leaching step, further comprising
- a pumping step in which the leached-out oxygen ions are pumped from a receiving region into a pump space by means of the selective oxygen pump.

13. The method as claimed in claim 12, further comprising
- a neutralization step in which the oxygen ions are neutralized at an interior electrode of the selective oxygen pump and oxygen gas is produced.

14. The method as claimed in claim 12, wherein the oxygen ions are primarily oxygen anions.

15. The electrolysis apparatus as claimed in claim 1, wherein
- the at least one selective oxygen pump has at least one zirconium oxide element, which is configured for a selective transfer of oxygen from the receiving region into a pump space.

\* \* \* \* \*